United States Patent [19]
Hultermans

[11] Patent Number: 5,542,015
[45] Date of Patent: Jul. 30, 1996

[54] OPTICAL FIBER CONNECTOR LATCHING MECHANISM

[75] Inventor: Antonius P. C. M. Hultermans, Tilburg, Netherlands

[73] Assignee: The Whitaker Corporation, Wilmington, Del.

[21] Appl. No.: 345,063

[22] Filed: Nov. 25, 1994

[30] Foreign Application Priority Data

Apr. 8, 1993 [GB] United Kingdom .................. 9307488

[51] Int. Cl.[6] ........................................................ G02B 6/38
[52] U.S. Cl. ................................ 385/60; 385/55; 385/56; 385/66; 385/70; 385/72; 385/77; 385/78; 385/139
[58] Field of Search ........................ 385/55, 56, 60, 385/62, 66, 70, 72, 77, 78, 81, 84, 87, 139

[56] References Cited

U.S. PATENT DOCUMENTS

| | | | |
|---|---|---|---|
| 4,406,514 | 9/1983 | Hillegonds et al. | 385/60 X |
| 4,953,941 | 9/1990 | Takahashi | 385/72 X |
| 5,129,023 | 7/1992 | Anderson et al. | 385/70 |
| 5,134,679 | 7/1992 | Robin et al. | 385/90 |
| 5,187,768 | 2/1993 | Ott et al. | 385/140 |
| 5,285,510 | 2/1994 | Slaney | 385/78 |
| 5,432,879 | 7/1995 | Lee | 385/60 |

FOREIGN PATENT DOCUMENTS

0430107A2  6/1991  European Pat. Off. ........... 385/60 X

OTHER PUBLICATIONS

Iwano, et al., "Compact and Self–Retentive Multi–Ferrule Optical Backpanel Connector," Oct. 1992, *Journal of Lightwave Technology*, pp. 1356–1362.

PCT International Search Report PCT/US94/03311 Jun. 29, 1994.

*Primary Examiner*—Brian Healy

[57] ABSTRACT

An optical fibre connector is shown comprising a jack mounted to a mother board and a plug mounted to a daughter board. The plug has a slidable insert retained by thrust lances against a shoulder of the plug housing such that the insert can be inserted into a cavity of the jack. Latches of the jack serve to latch onto ribs of the plug insert so as to butt a ferrule of the plug against a ferrule of the jack resiliently together. Further insertion of the insert into the jack causes ribs to release the thrust lances of the plug insert such that the insert springs rearwards allowing the plug housing to slide forwards without spring resistance, enabling absorption of a certain tolerance in the spacing between the daughter board and the mother board.

37 Claims, 17 Drawing Sheets

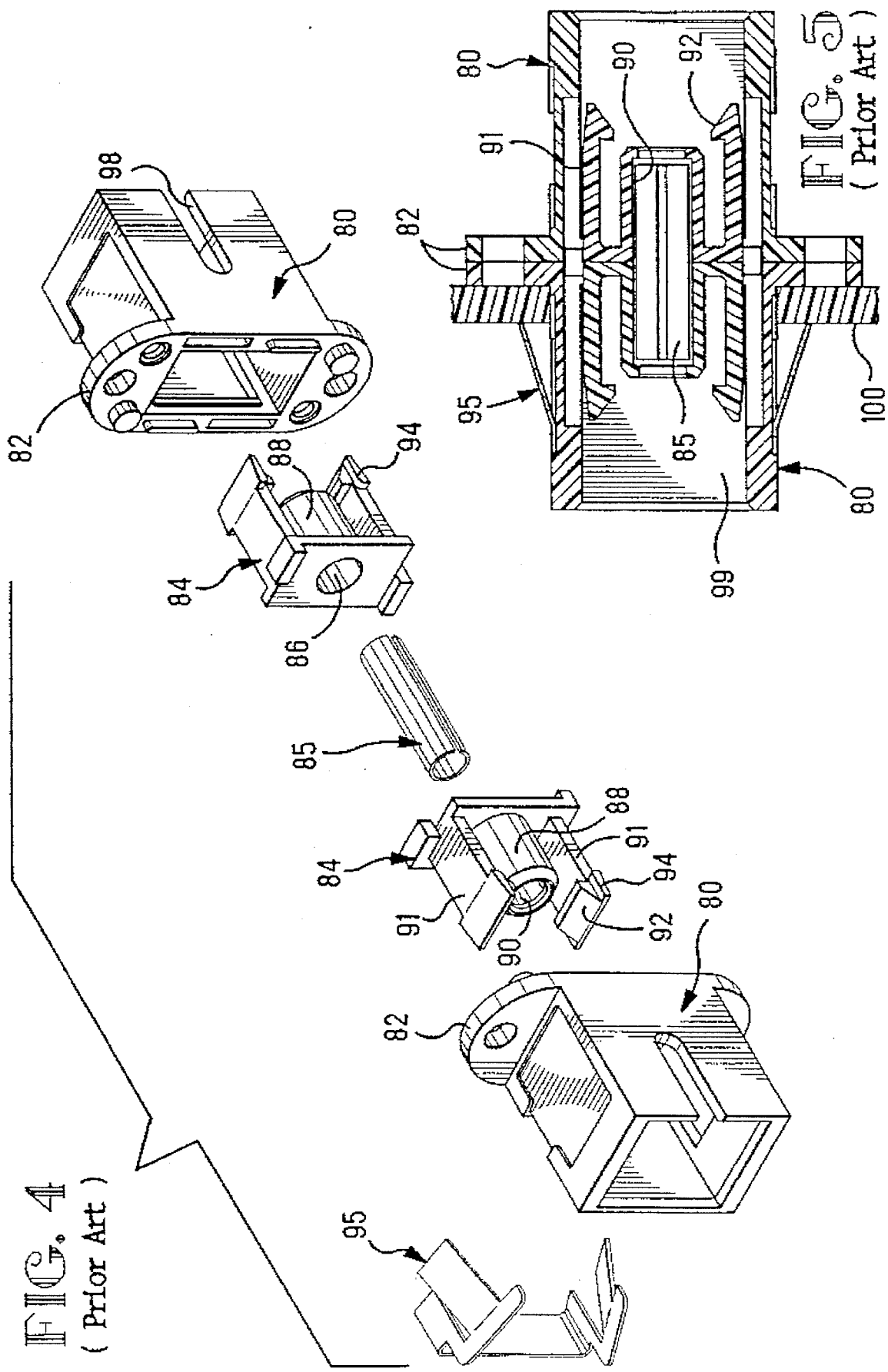

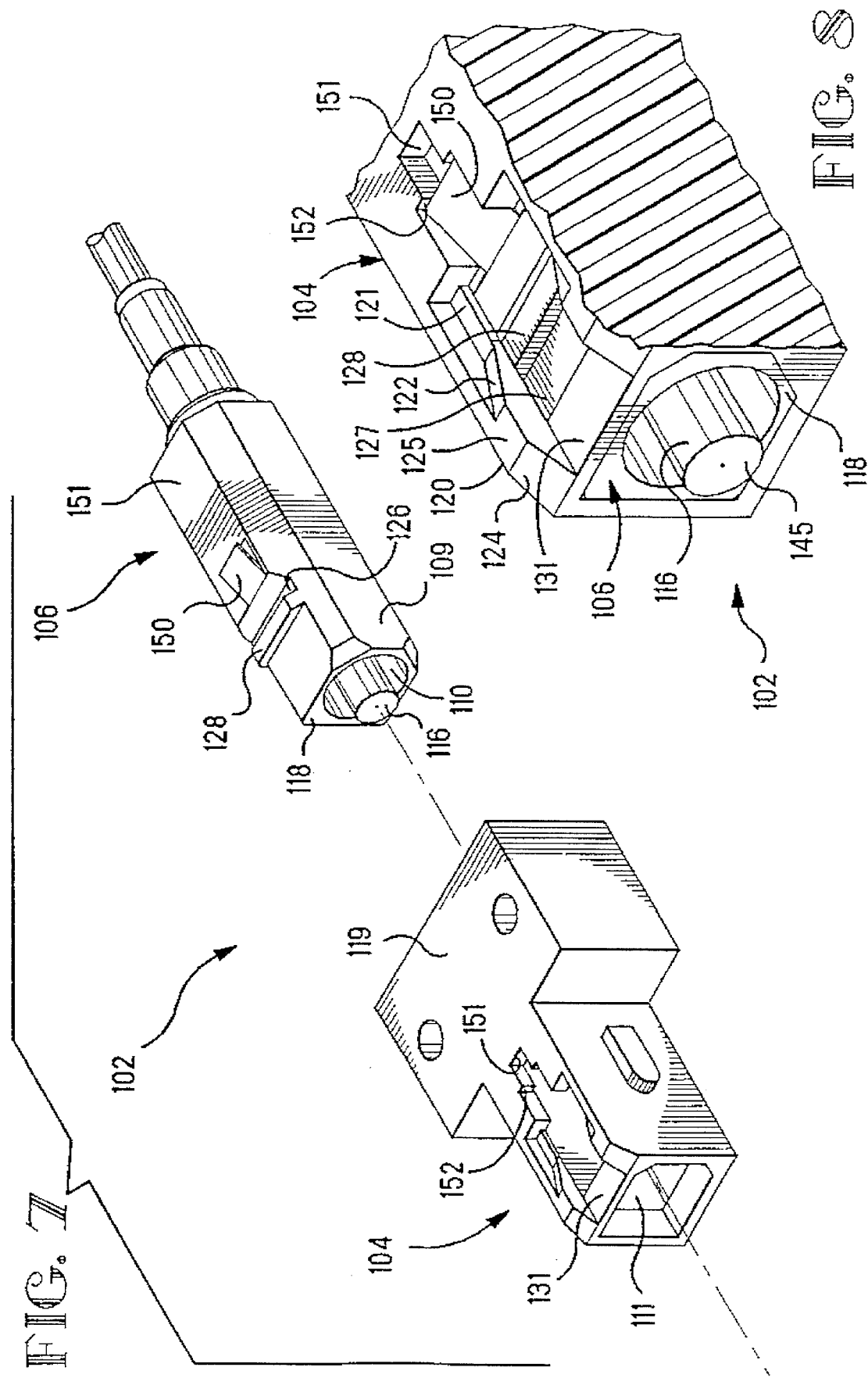

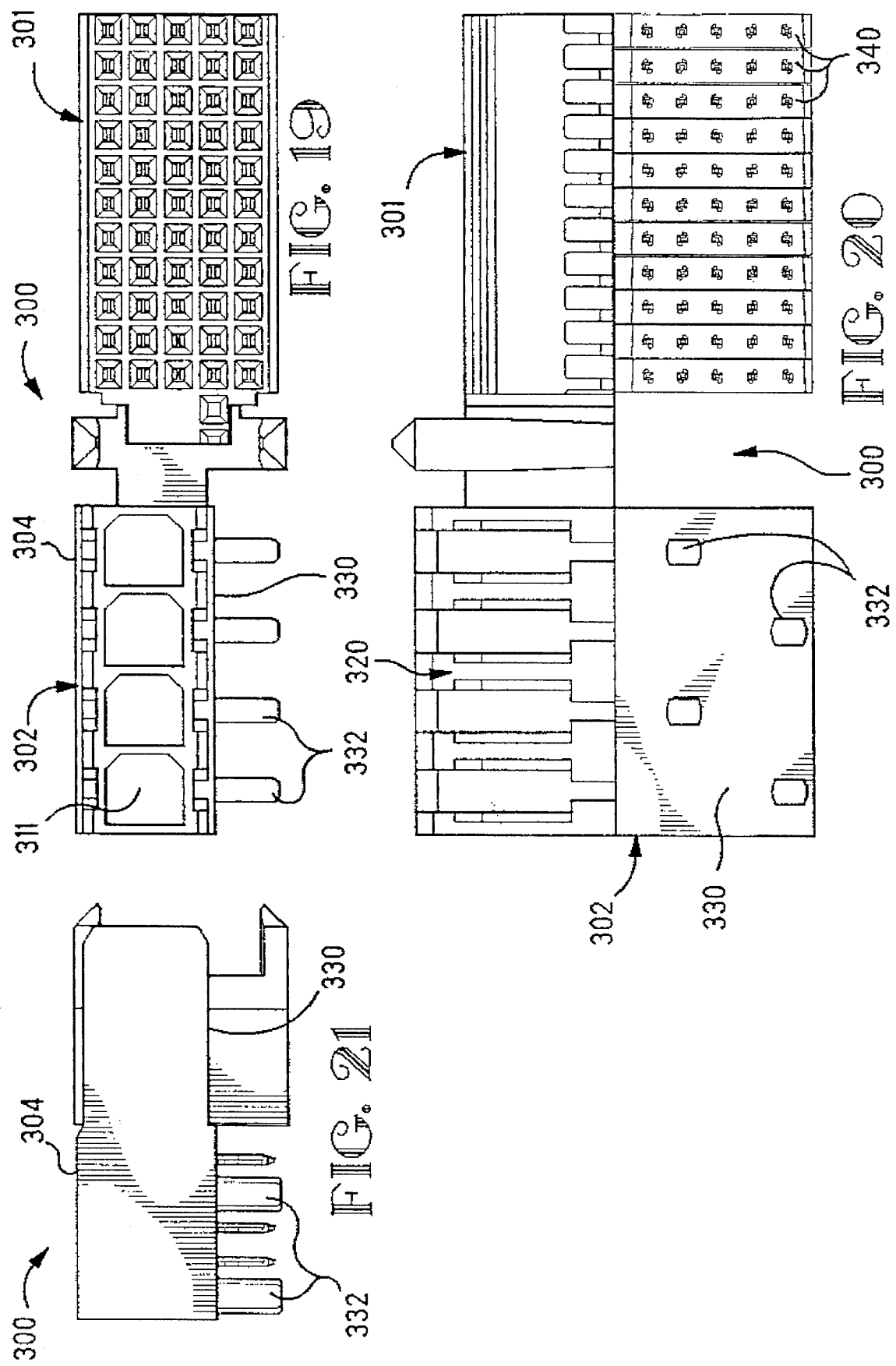

OPTICAL FIBER CONNECTOR LATCHING MECHANISM

BACKGROUND OF THE INVENTION

1. Field of the Invention

This invention relates to a mechanism for latching an optical fibre connector, and in particular a latching mechanism for a connector making optical connection between a panel or mother board and a circuit board.

2. Description of the Prior Art

It is relatively common in the electronics industry, to transfer signals by way of an optical fibre due to a number of advantages that light transmission has over transmission of electrical signals, namely the very high transmission rate of signals and the insensitivity of light signals to electrical and magnetic fields. One common example of high speed data transmission is between substrate boards with printed electrical circuits thereon, whereby it is often desirable to have both electrical and optical connection between the boards, this connection often occurring between a mother board and daughter boards.

An optical fibre cable is typically built up of an inner core surrounded by cladding, and therearound fibres for reinforcement and further, a protective plastic insulation. The core carries all or most of the light and is usually made of glass or plastic, whereby the diameter of this core may even be as small as two to eight microns. The cladding surrounding the core is typically made of plastic or glass and serves to keep the light within the inner core due to the specifically chosen, and different refraction indexes of the core and cladding, whereby the outer diameter of this cladding may be around twenty to one hundred and twenty five microns. The very small diameter of the inner, light transmitting core means that great accuracy is needed when coupling two optical fibres together. This is achieved by feeding the core and shell through the bore of a precisely manufactured ferrule and holding it therein by bonding, the optical fibre projecting through the tip of the ferrule, and the tip of the ferrule is then finely polished so that the optical fibre is flush to the tip of the ferrule. The ferrule is then inserted into a precisely manufactured sleeve which accurately centers and aligns the ferrule whereby the ferrule of another optical cable can be introduced through the other end of the sleeve until both ferrule tips butt against each other in accurate alignment. It is also important to ensure that the gap between the tips of connecting optical fibres is as small as possible and remains constant, thus requiring that the ferrules press against each other. This is achieved by springs mounted in the optical fibre connector and pushing against the ferrule. The spring also absorbs the varying axial positions of the ferrule tips. In order to allow the accurate centering of the ferrules in the sleeve, it is necessary to allow the ferrules to "float" with respect to the connector, this being achieved, for example, by leaving some play between the ferrule and the housing.

One of the difficulties of making optical connection from board to board arises from the inaccurate spacing of the boards which could be caused, for example, by using a hybrid connector where a number of adjacent optical and/or electrical connectors are positioned on a board and simultaneously plugged into mating connectors on the mother board. Electrical connectors can be easily designed for absorption of two or three millimetres of axial misalignment by simply making the receptacle and mating pin or tab terminal sufficiently long. The problem with optical connectors however, is that the axial misalignment is absorbed by the spring means as mentioned above, which may produce either a very high compression force or insufficient compression force. This varying spring force is undesirable due to the potentially high loads on the mother board and the uncontrolled butting forces of the ferrules. Additionally, it is desirable to avoid taking up the spring forces through the boards as it causes them to warp and also requires stronger and more expensive structural support thereof.

Some of the above problems have been partially overcome by the prior art described in "Compact and Self-Retentive Multi-Ferrule Optical Back Panel Connector" published in "Journal of Light Wave Technology, VOL. 10, NO. 10, October 1992". This reference describes a jack mounted to a back panel and a plug mounted to a printed circuit board for optical connection therebetween, whereby the plug has a latching mechanism for latching to an inner housing of the jack. The plug also has a latch release which disconnects the plug and jack from an outer housing of the jack, this outer housing being connected to the backpanel. This solution provides a means of releasing the connection spring forces from the boards and also allow axial movement of the plug and jack with respect to the backpanel, thereby absorbing axial tolerances. One of the problems however, associated to this solution, is that the backpanel jack may have a considerable number of optical connections, whereby the optical cables leading into the rear of the back panel jack are relatively heavy and stiff, thereby loading the jack.

The plug however must be able to slide within an outer housing meaning that the fixture between the jack and outer housing must allow a little play. Not only is the fixture of the jack to the backpanel thus weakened by the sliding requirement, but sliding of the jack within the outer housing is made more difficult due to the increased frictional force and tilting of the jack within the outer housing because of the loading from the optical cables.

SUMMARY OF THE INVENTION

One of the objects of this invention, is therefore to provide an optical connector that can absorb axial misalignment and yet have a strong and fixed connection between the plug and the jack.

Another object of this invention, is to provide an optical connector that exerts no significant forces through the objects to which they are mounted.

Yet another object of this invention is to provide an optical connector that can absorb axial misalignment without affecting the spring forces within the connector.

Yet another object of this invention is to provide a reliable latching mechanism for an optical connector that can be very easily latched and unlatched without the need for any tools.

A further object of the invention is to provide an optical connector particularly suitable for use in a hybrid connection system comprised of both optical and electrical connectors, where the optical connectors have the ability to absorb axial tolerance necessary for the electrical connector.

The objects of this invention have been accomplished by providing an optical fibre connector comprising at least one jack and at least one plug for optical connection therebetween, characterized in that the jack housing has latching means that engage with means of a plug insert for locking therebetween in opposition to the force of spring means, the plug insert slidable within the plug housing and having thrust means that engage with thrust means of the plug housing to enable insertion and latching of the plug insert into the jack by exerting a force in opposition to the spring force on the plug housing, and whereby the jack housing includes means to disengage the thrust means such that the spring forces are taken up by the latching means and the plug housing is free to slide over a tolerance absorption distance towards the jack with no substantial force required.

BRIEF DESCRIPTION OF THE DRAWINGS

FIG. 4 shows an exploded view of the receptacle assembly shown in FIG. 1,

FIG. 5 shows a cross sectional view through the axial centre line of the receptacle assembly of FIGS. 1 and 4;

FIG. 7 shows an exploded isometric view of a single position plug connector in accordance with the present invention;

FIG. 8 is a detailed isometric view of the front latching profile for the housing shown in FIG. 7;

FIG. 11 is an instantaneous view of the release of the thrust means;

FIG. 19 is a front plan view of an integral housing for a hybrid connector carrying both optical and electrical contacts;

FIG. 20 shows a lower plan view of the housing shown in FIG. 19; and

FIG. 21 shows a side view of the housing shown in FIG. 19.

DETAILED DESCRIPTION OF THE PREFERRED EMBODIMENT

Figure 1:
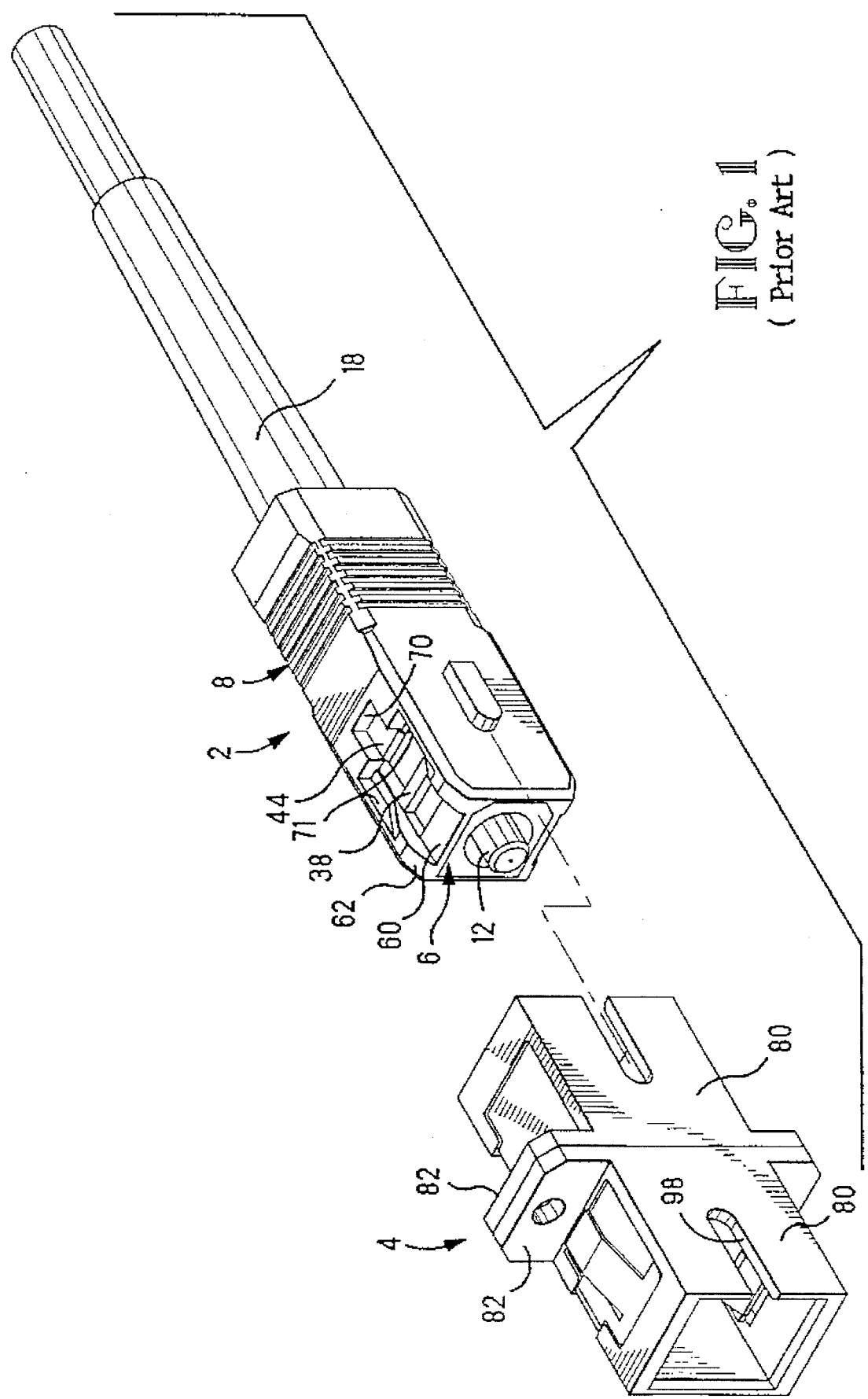
FIG. 1 is an isometric view of a commercially available plug and jack assembly.

With reference first to FIG. 1, a commercially available fibre optic plug assembly is shown generally at 2 which is insertable and latchably connected to a receptacle jack assembly shown at 4. This known fibre optic connector plug 2 is comprised of an inner plug body shown generally as 6 and an outer plug housing 8.

Figure 2:
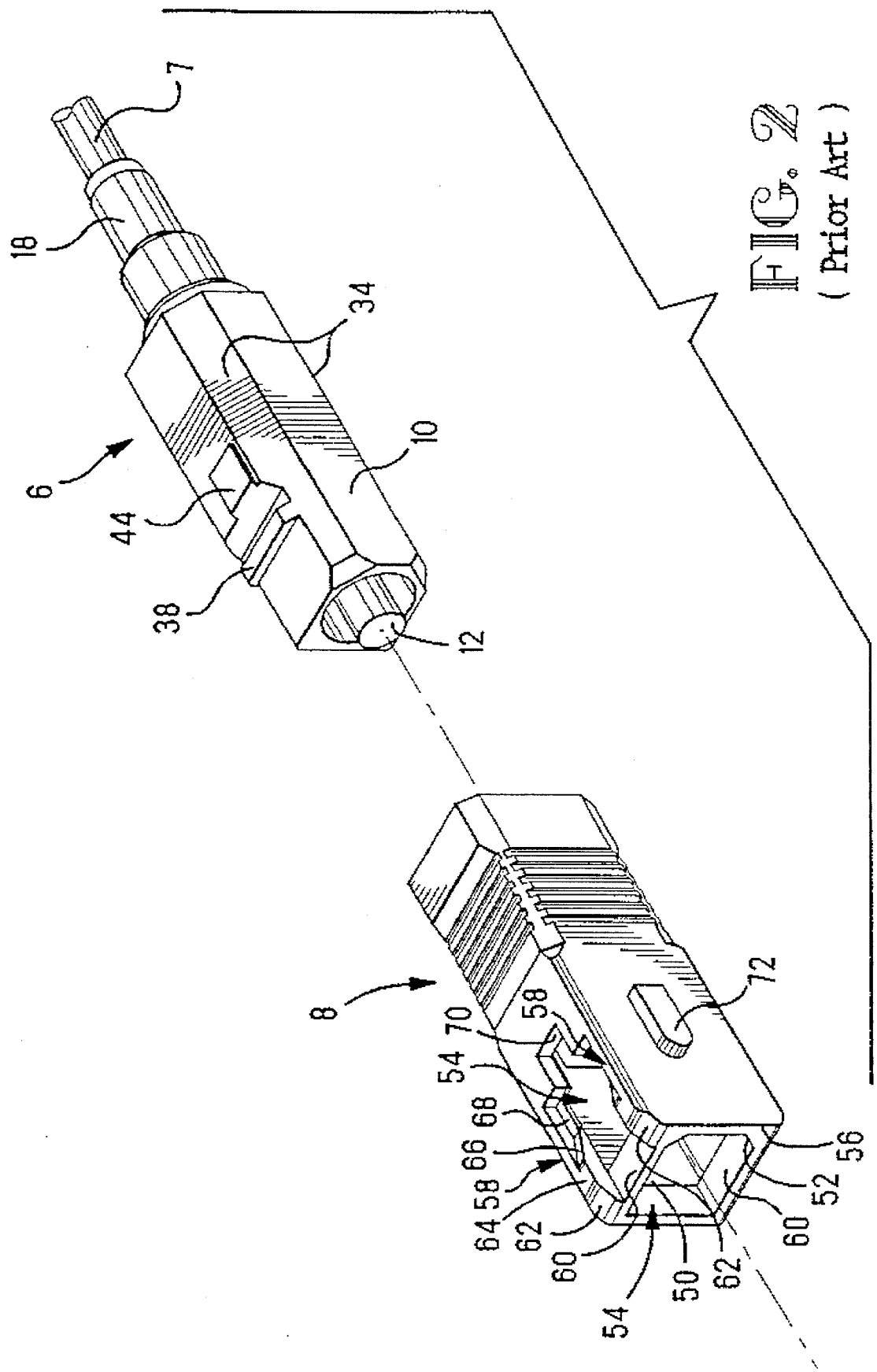
FIG. 2 is an exploded view of the plug assembly shown in FIG. 1.
Figure 3:
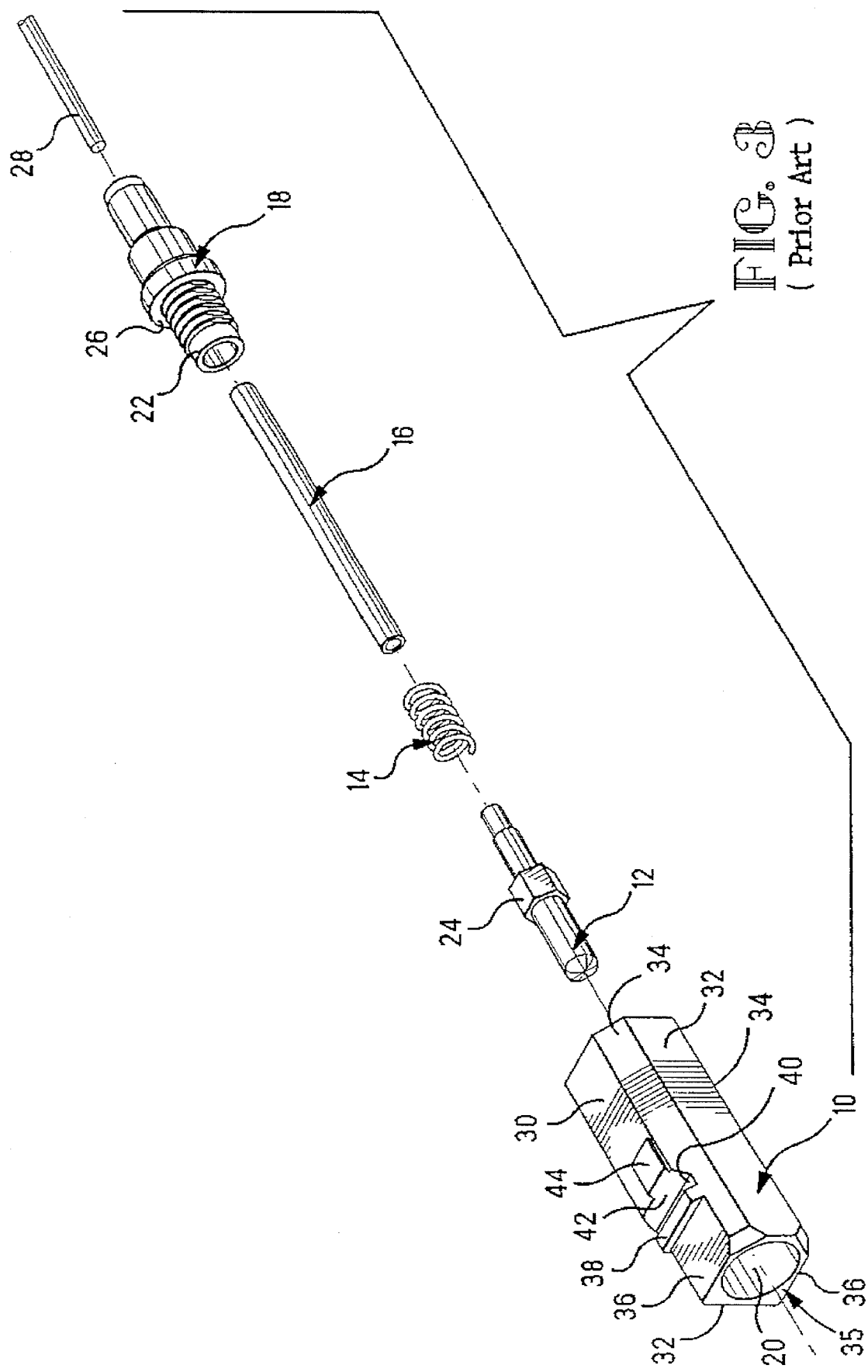
FIG. 3 shows an exploded view of the plug body assembly of FIG. 2.

With reference now to FIGS. 2 and 3 the plug assembly 2 will be described in greater detail. The inner plug body 6 shown in FIG. 2, is shown in FIG. 3 exploded to include an insulative housing body 10, a ferrule assembly 12, a coil spring 14, insulative tubing 16, and an inner body portion 18. The body portion 10, includes an inner cavity 20 for receiving the ferrule 12 and a rear portion of the cavity 20 is profiled to receive a front end 22 of the inner body portion 18 such that the ceramic ferrule 12 is floatable within the body portion 10 spring loaded between a piston portion 24 of the ferrule assembly and an outer flange 26 of the inner body portion 18. Thus a fibre 28 is slidably receivable through the inner body portion 18, insulative tubing 16, the coil spring 14, and into its final position within the ferrule 12, whereby the ferrule and inner body portion 18 are received into the housing member 10 for spring loaded retention therein.

The housing body 10 includes upper and lower surfaces 30 and side surfaces 32. The body member 10 has chamfered surfaces as 34 providing a polarizing feature for the body 10 as will be described in greater detail herein. The body member 10 has recessed surfaces at 36 which extend rearwardly to a transverse rib 38, behind which is a further recessed surface at 40. Continuing rearwardly, a ramped surface is provided at 42 which leads up to a raised stop surface 44. It should be appreciated that, the lower side of the body 10 as viewed in FIG. 3 is identical to the top surface, however as viewed in FIG. 3, only one such surface is visible.

With reference now to FIG. 2 the outer plug housing 8 is shown in greater detail, and includes an inner cavity at 50 for slidably receiving the housing body member 10, from the rear thereof, into a locked condition. The cavity 50 is provided with surfaces 52 which correspond to the chamfered surfaces 34 for correct polarization of the plug body 10 into the outer housing 8. The outer housing 8 is provided with a latching opening at 54 which extends toward the front mating face 56. The openings 54 define two side walls 58 flanking the openings 54 and which are interconnected by upper and lower bridge portions 60. The side walls 58 extend rearwardly from the front face 56 and include camming surfaces 62 which extend obliquely rearwardly to a top surface 64 of the outer housing 8. On the inner surface of the side walls 58, a recess is formed including a declining edge 66 and a horizontal edge 68. At the rear edge of the opening 54, a notch is formed at 70 which forms a stop member for the housing 8 as will be described in greater detail herein. Finally the housing 8 includes a polarizing lug 72 on one side only of the housing for correct polarization with the receptacle member 4.

The inner assembly 6 can now be slidably received into the rear of the housing 8 to a fully locked position as shown in FIG. 1, where the raised stop surface 44 is received within the notch 70, which prevents withdrawal of the plug body 6. The plug body 6 is also moveable forwardly within the plug housing 8, to a position where the transverse rib 38 abuts a rear edge of the bridge portion 60.

With reference now to FIGS. 1, 4 and 5, the receptacle assembly 4 will be described in greater detail. The receptacle assembly 4 is comprised of two identical halves 80 having flanges 82 which can be butted one to the other and fixed in place by such means as adhesive or ultrasonic welding. The receptacle assembly 4 further includes, two identical latch members 84 which receive between them a fibre aligning ferrule 85. The ferrule 85 is received within openings 86 in the rear of the latch members 84, and is retained within cylindrical sleeve portions 88 of the latch members 84 by way of a shoulder 90 at the front end of the cylindrical sleeves 88, as best shown in FIG. 4 and 5. The latch members 84 further include latch extensions 91 which include individual latch projections 92, which are flanked by side wing portions at 94. A metal spring clip member 95 can be clipped to one of the receptacle halves 80, whereby the receptacle assembly 4 can be clipped to a panel such as a mother board 100 as shown in phantom in FIG. 5, where the receptacle assembly 4 is held to the mother board 100 between the flanges 82 and a locking lance 96 found on the clip member 95. Finally the identical halves 80 include a polarizing slot 98 for receiving the polarizing lug 72 on the plug assembly 2.

Interconnection and disconnection of the plug assembly 2 to the receptacle assembly 4 will now be described in greater detail. The plug assembly 2 can be received within a receiving cavity 99 (FIG. 5) of the receptacle assembly 4 such that the ferrule 12 is positioned within the aligning ferrule 85 in the receptacle assembly 4. It should be appreciated that the wing members 94 (FIG. 4) on the latch extensions 91 are as wide as, the cam surfaces 62, (FIG. 2) but narrower than inner surfaces 71 (FIG. 1) on the side walls 58 (FIG. 2). Therefore movement of the plug member 2 into the receptacle assembly 4 causes the outer wing members 94 to ride up cam surfaces 62 to a position where the wing members are on the top surface 64, whereby continued insertion of the plug member 2 causes the wing members 94 to ride down the surface 66, to a resting position on surface 68 (FIG. 2). This positions the latch projection 92 of the receptacle assembly 4 behind the transverse rib 38 on the housing body 10. Due to the spring load on the front face of the ferrule member 12, the inner plug body 6, when mated, is always situated in such a position so that the latching engagement of projection 92 is in an abutting relation with the transverse rib 38. A pulling force against the inner body member 18 or on the fibre cable 7 will not remove the plug member 2 from the receptacle member 4 due to the latching engagement of projection 92 behind the transverse rib 38.

To extract the plug member 2 from the receptacle member 4, the outer housing 8 can be moved rearwardly to the position where the front edge of the transverse rib 38 abuts the rear edge of the bridge portion 60 (FIG. 2) causing the outer wings portions 94 (FIG. 4) to ride up the surface 66 and be situated on the upper surface 64 (FIG. 2). This causes raising up of the latch member 92, such that further rearward movement of the outer plug housing 8 causes removal of the entire plug assembly 2.

A substantial improvement has been made to the above mentioned connector system for use, for example on daughter board connectors, and preferably in combination with electrical connectors having pins and mating receptacles. With more particularity, the inventors have proposed that a fibre optic connector similar to that disclosed in FIGS. 1 through 3 is mounted on a daughter board along side of a receptacle connector similar to that disclosed in European Publication Number 0422785. Similarly, a receptacle assembly similar to that disclosed in FIGS. 4 through 5 above would be interconnected to the mother board along side the tab header which is also described in the above mentioned European Patent Application. While the combination of fibre connectors and a connector system as disclosed in the above mentioned European Patent Application is highly desirable, new complications are added by their combination.

A requirement for such a system as described in the above mentioned European Patent Application must have an axial tolerance, between mating connectors of (2.5) mm, for example. Therefore a fibre optic system as described above with reference to FIGS. 1–5, is not useable, as this fibre optic system would substantially load the mother board and daughter board. For example, if a connector plug similar to that of FIG. 2 were mounted directly on a daughter board, and the electrical plug and fibre plug were received within their respective mating tab header and fibre receptacle, and brought into mating engagement, to the position where the fibre plug is fully latched, that is where the latch projection 92 is seated behind the transverse rib 38 as described above, it may still be necessary, due to the tolerance factors as described, to move the daughter board further forward another (2.5) mm. While forward movement of the daughter board would be possible, due to the coil spring 14, the additional force added to the ferrule by added deflection in the coil spring would be unbearable for the daughter board and mother board as the full axial load is taken up thereby.

Figure 6:
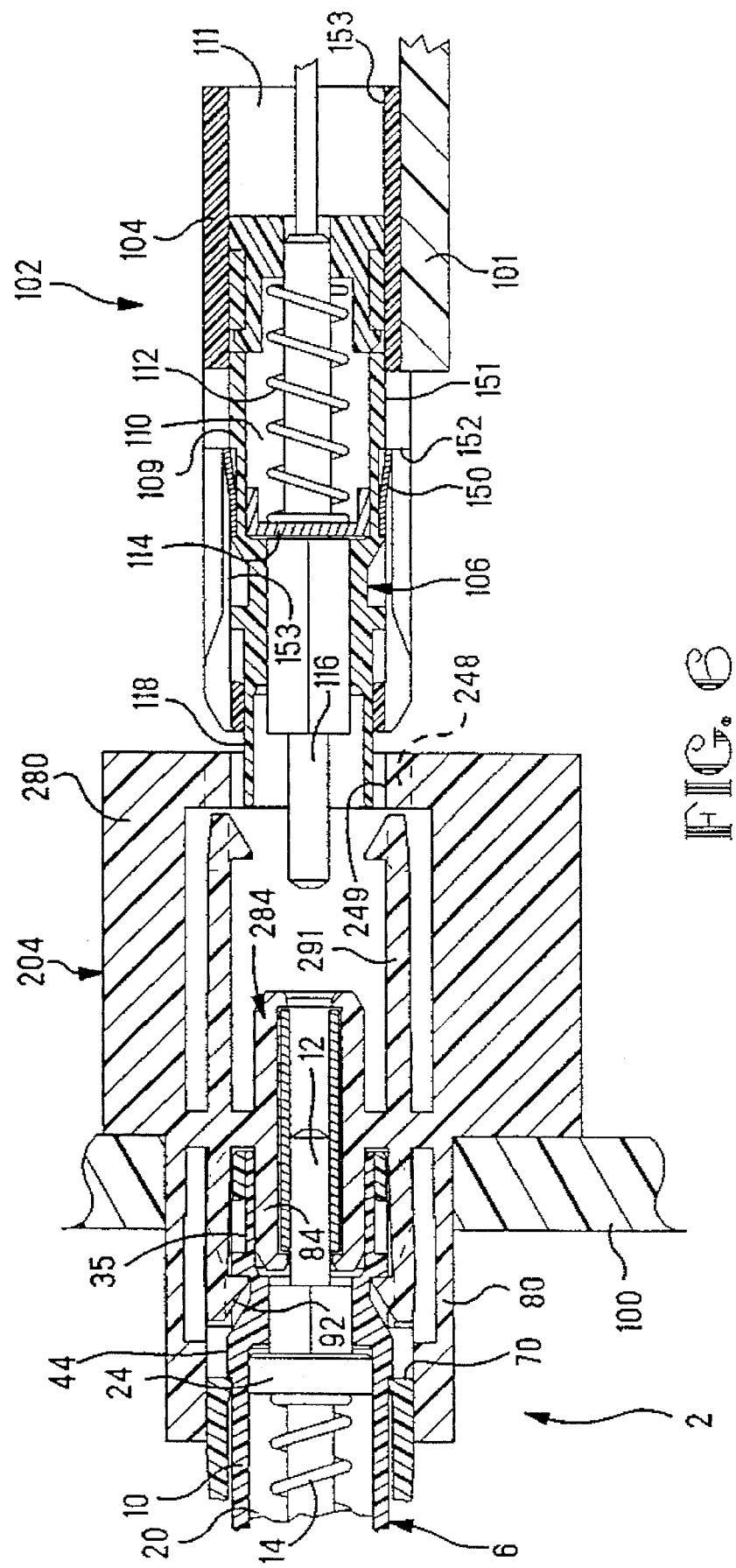
FIG. 6 is a cross sectional view of a jack of the present invention about to be inserted into a plug whereby the receptacle jack housing is shown with phantom lines.

With reference now to FIG. 6, a fibre optic system useable in combination with electrical connectors, so-called hybrid connectors, is shown. It should be recognized that the plug which mounts from the left hand side of the mother board, can be, and in fact is shown to be, identical to the prior art plug connector of FIG. 1, As shown in phantom of FIG. 6, the receptacle assembly is somewhat different from that shown in FIG. 1, and is therefore labelled by reference numeral 204. However, the receptacle 80, and inner latch member 84, are basically the same as that described above with reference to FIGS. 1–5.

With reference now to FIGS. 6 and 7, a plug having some similar features to the plug 2, is generally shown at 102 with an outer housing 104 mounted to a printed circuit daughter board 101 and an inner plug body 106 that is slidably received within a cavity 111 of the housing 104. The plug body 106 has a housing 109 (FIG. 7) comprising an inner cavity 110 in which is mounted a coil spring 112 that pushes on a piston 114, and to the piston 114 is mounted a ferrule 116 which has a thin central bore for receiving an optical fibre.

Referring now to FIG. 7 the housing 109 is shown having a shroud 118 surrounding the ferrule 116. In a similar manner to the previous plug body 6, the plug body 106 also has a transverse rib 128, having a recess 126 therebehind. Rather than having a raised surface such as 44 shown in the embodiment of FIG. 1, the plug body 106 has a resilient locking lance 150, which for example, could be clipped around the insert housing 109, or can be an integral part of the body 106.

With respect now to FIG. 8, the outer housing 104, includes camming members 120 with a tapered front camming surface 124, an upper surface 125, a tapered rear release surface 122 and a lower surface 121. There are two cams 120 separated by an opening 127. At a front end of the outer housing body 104 is a bridge portion 131 that joins the camming members 120. The bridge 131 also serves to retain forward extraction of the plug body 106, whereby forward extraction of the plug body 106 causes the transverse rib 128 of the plug body 106 to abut the bridge 131.

Referring back to FIG. 6, the plug housing 109 has an outer peripheral surface 151 that is substantially profiled as an inner surface 153 of the cavity 111 such that the plug body 106 is slidably held within the cavity 111. The resilient thrust lances 150 that project obliquely rearwardly are engageable with a shoulder front face 152 of the receptacle housing 104. The plug body 106 is held in an opposite sense by transverse rib 128 against the bridge portion 131. The thrust lances 150 enable insertion of the jack insert 106 into the plug 2 because latches 150 are engaged with the shoulder 152 of the insert whilst spring forces on the butting ferrules 12, 116 provoke a rearwards pushing force on the plug body 106. It should be pointed out at this point, that the ferrule 116 extends outwardly beyond the shroud 118, further than the corresponding ferrule 12 beyond its corresponding shroud 35, for reasons which will be apparent herein.

As shown in FIG. 6, a jack housing 204 is shown, which is similar in nature to the jack housing 4 as described above. As mentioned above, the mother board side can have a jack receptacle member 80 similar to that described above, as well as a latch insert 84 which is identical to that described above. However on the daughter board side, a special jack housing part 280 is required, having centrally positioned actuator ribs 248 positioned adjacent to the mating face of the jack housing 280, such that the width of the ribs 248 are profiled to be received between the two cam members 120 (FIG. 8). A different latch member 284 is also required, which has latch arms 291 substantially longer than the corresponding latch arms 91 of the opposite side, for reasons which will be described in greater detail herein.

Figure 9:
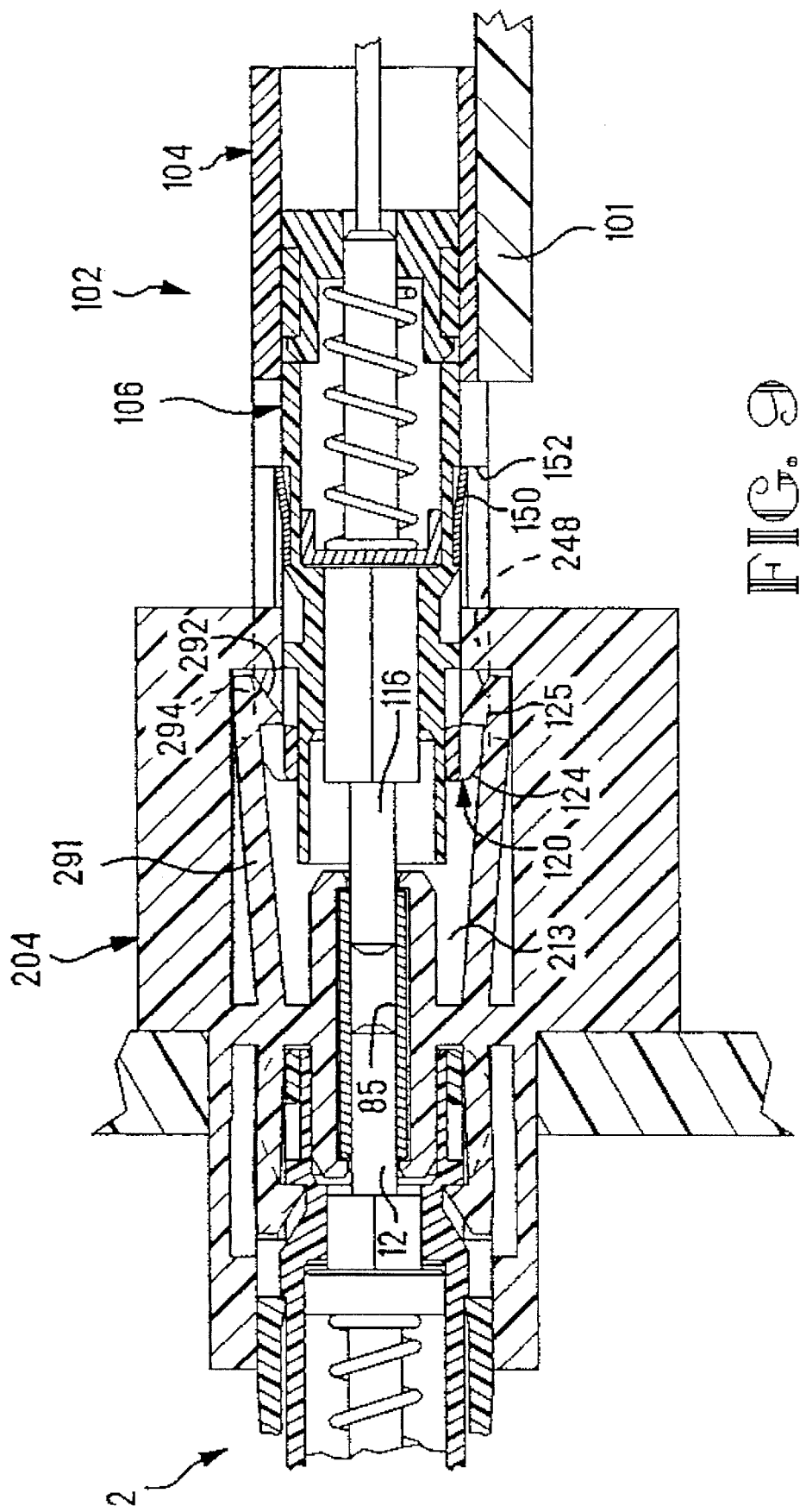
FIGS. 9 to 13 show the complete latching sequence of the jack and plug whereby
Figure 10:
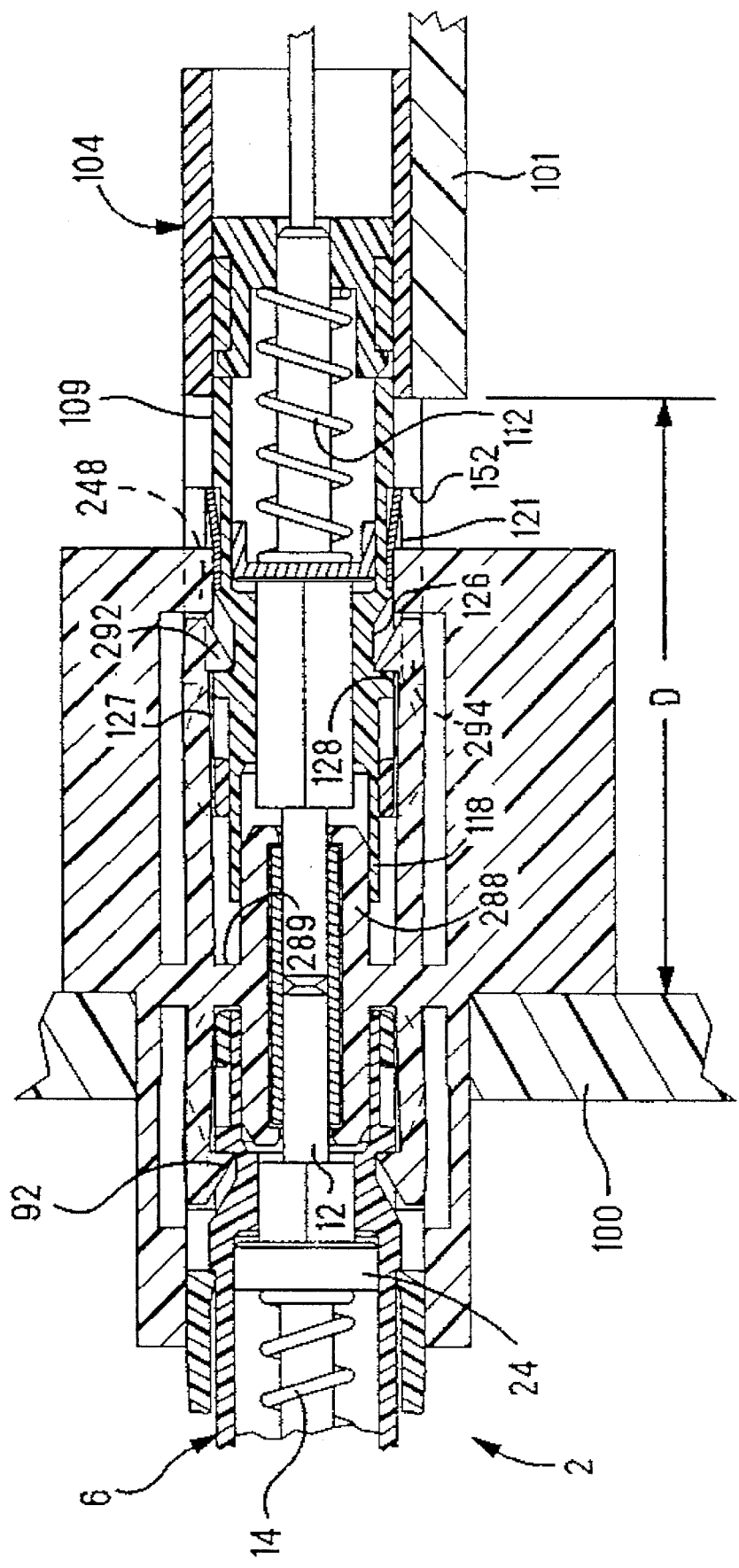

The latching sequence is best shown in FIGS. 9 to 13, whereby in FIG. 9 the plug 102 is shown partially inserted into a cavity 213 of the jack 204 with the ferrule 116 partially inserted into the sleeve 85 and the latches 291 biased resiliently outwards due to engagement of the wings 294 with the insert camming surface 124, 125. The latch protrusion 292 passes over the bridge portion 131 between the camming members 120. FIG. 10 shows the latching protrusion 292 within a recess 126 of the jack insert housing 109 and behind the transverse rib 128 preventing rearward extraction thereof. The projections 292 project through the opening 127 between camming members 120 (also see FIG. 8), and the wings 294 rest on the lower camming surface 121. In the position shown in FIG. 10, the jack insert shroud 118 is over the centre part 288 and the ferrules 12, 116 abut each other with a spring force. In the position of FIG. 10, optical connection between the two plugs 2, 102, is achieved and the plugs are releasably latched to the jack 204. It is important to note that the shroud 118, unlike its counterpart 35, is spaced from the end surface 289, when in the position shown in FIG. 10.

This is, however, an unfavourable situation because very little tolerance is allowed in the axial spacing D between the edge of the daughter board and the mother board. If the distance between the daughter board 101 and the mother board 100 is required to be less than D, a force would have to be applied to the plug housing 104 that would push the thrust lances 150 forwards and hence compress the spring 112, whereby the transverse rib 128 would move forwards, separating away form the latch projection 292.

If the thrust means 150, 152 are engaged and the distance separating the daughter 101 and mother board 1 is less than D the force loop would be as follows:

plug ferrule 116-piston 114-spring 112-plug body 109-thrust lances 150-jack housing 104-daughter board 101-ground or structure-mother board 100-jack housing 204-latches 92-jack insert housing 6-spring 14-piston 24-ferrule 12. As one can see in the above, the spring forces are taken up by the boards 100, 101, which is an undesirable situation as these forces can be quite high depending on the number of optical terminals in the connector, causing deformation of the boards 100, 101 and requiring a stronger and therefore more costly mounting structure.

Figure 11:
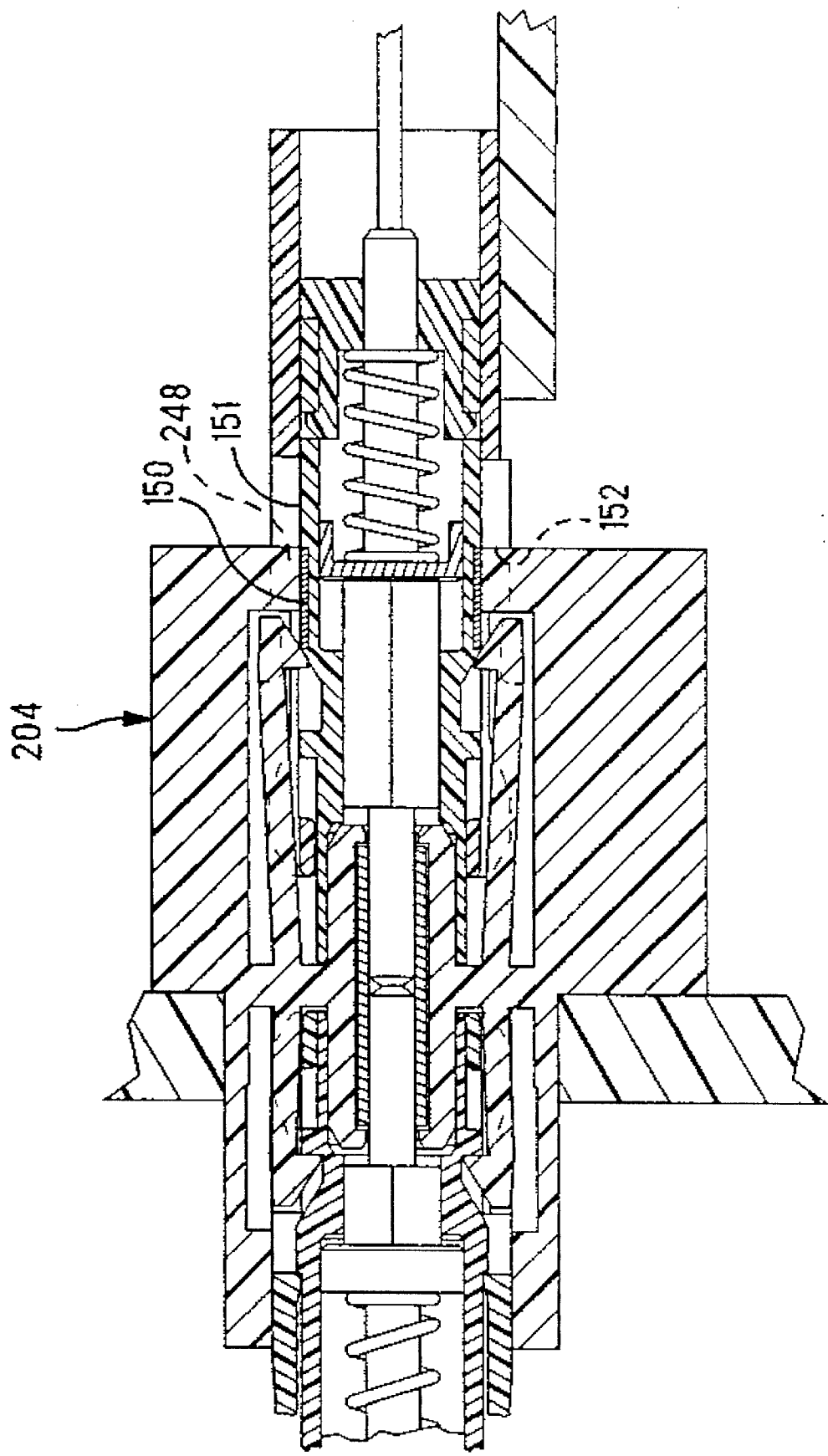

To avoid the above mentioned undesirable situation, the jack housing 204 is provided with actuator ribs 248 that slide between the camming members 120 of the plug 102 as seen in FIGS. 9, 10, and 11, whereby the ribs 248 have an inner surface 249 (FIG. 6) very close to the outer surface 151 of the housing 106. FIG. 11 illustrates the daughter board 101 and plug 102 inserted even further into the jack 204 until the ribs 248 are inserted past the shoulder 152 into the rib slots 151 of the plug housing 104, the resilient thrust lances 150 being deflected inwards such that they disengage with the shoulder 152. FIG. 11 actually represents an instantaneous view, as in this position the plug insert 106 is no longer thrust forward by the lances 150 and would therefore spring rearwards until the latch projection 292 catches the transverse rib 128, as shown in FIG. 12.

Figure 12:
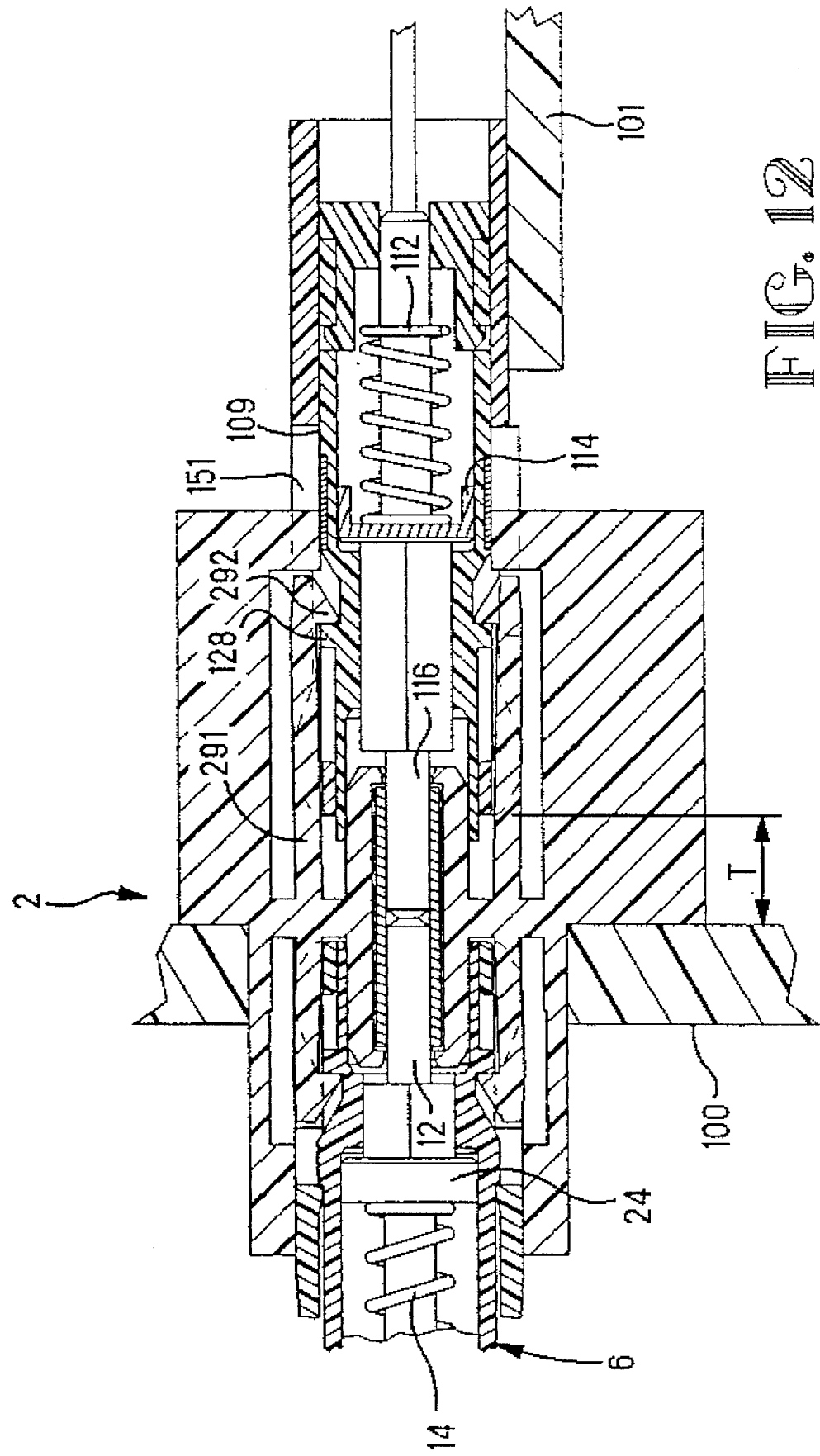
Figure 13:
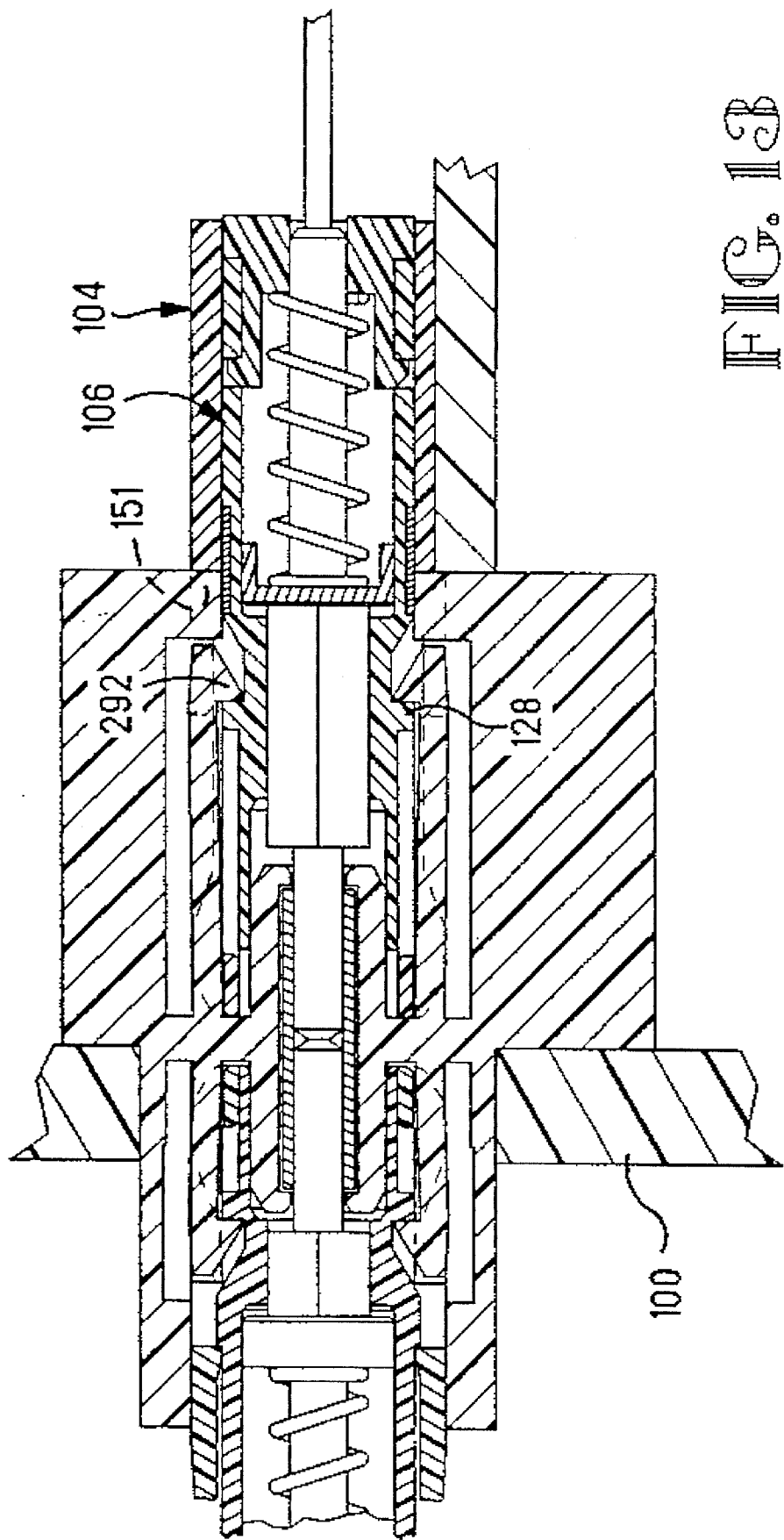

The force loop of the connection as shown in FIGS. 12 and 13 is contained within the connector and is as follows: plug ferrule 116-piston 114-spring 112-insert housing 109-jack latches 291-jack insert 6-jack spring 14-jack piston 24-jack ferrule 12.

The aforementioned force loop does not load the boards as was mentioned above when the thrust means 150, 152 were engaged. The plug housing 104 and thus the daughter board 101 can thereafter be slid forwards with virtually no resistance, to the position of FIG. 13 and back again to the position of FIG. 12, thereby allowing a tolerance T in the axial spacing of the daughter board 101 to the mother board 100, as represented in FIG. 13. This is allowable, as the plug housing 104 as shown in FIG. 12 and 13, is totally released from the plug body 106, the plug body being held to the mother board 100, exclusively by the projections 292 on the transverse ribs 128.

Figure 14:
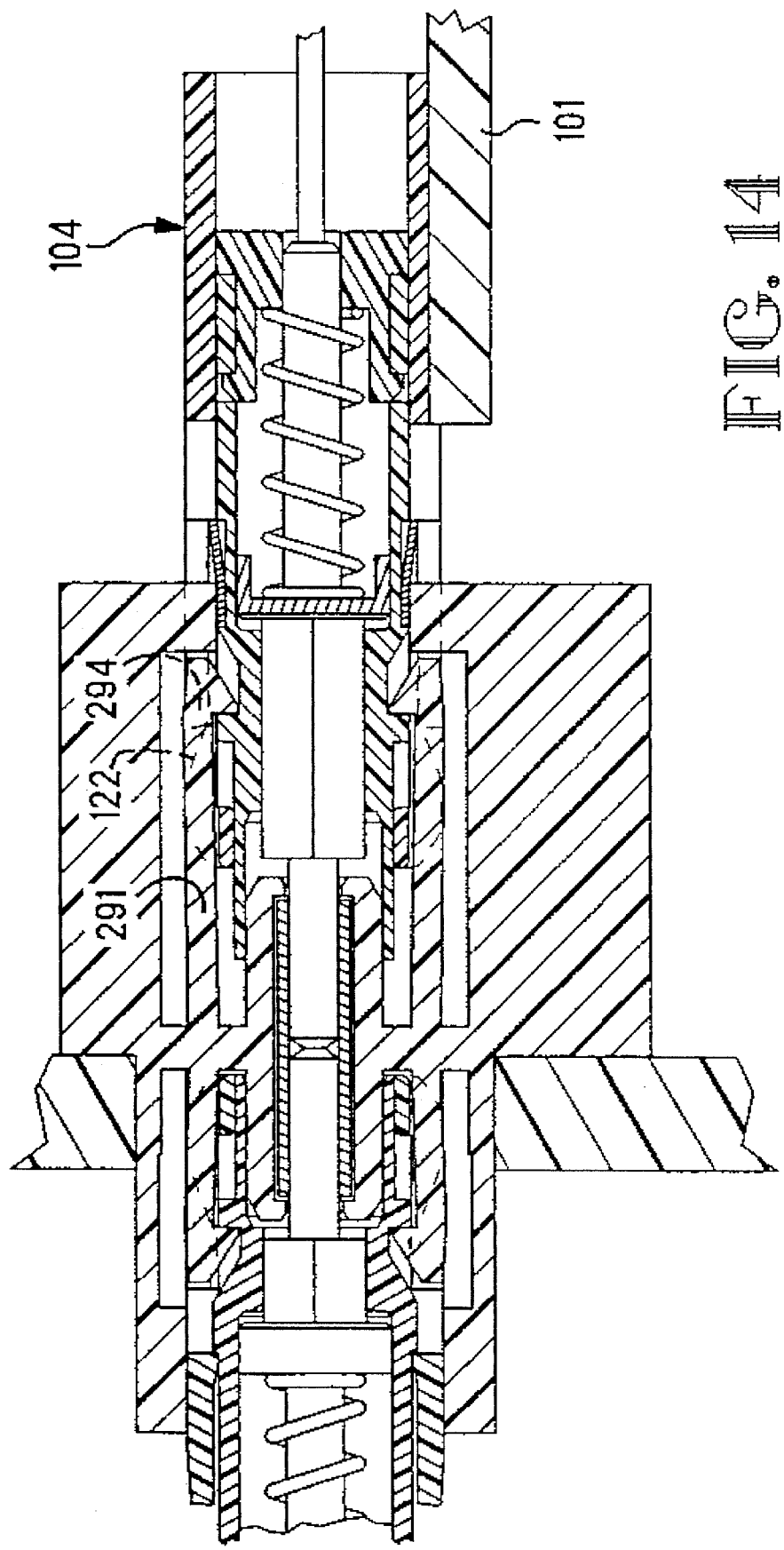
FIGS. 14 to 17 show the unlatching sequence of the plug and jack.
Figure 15:
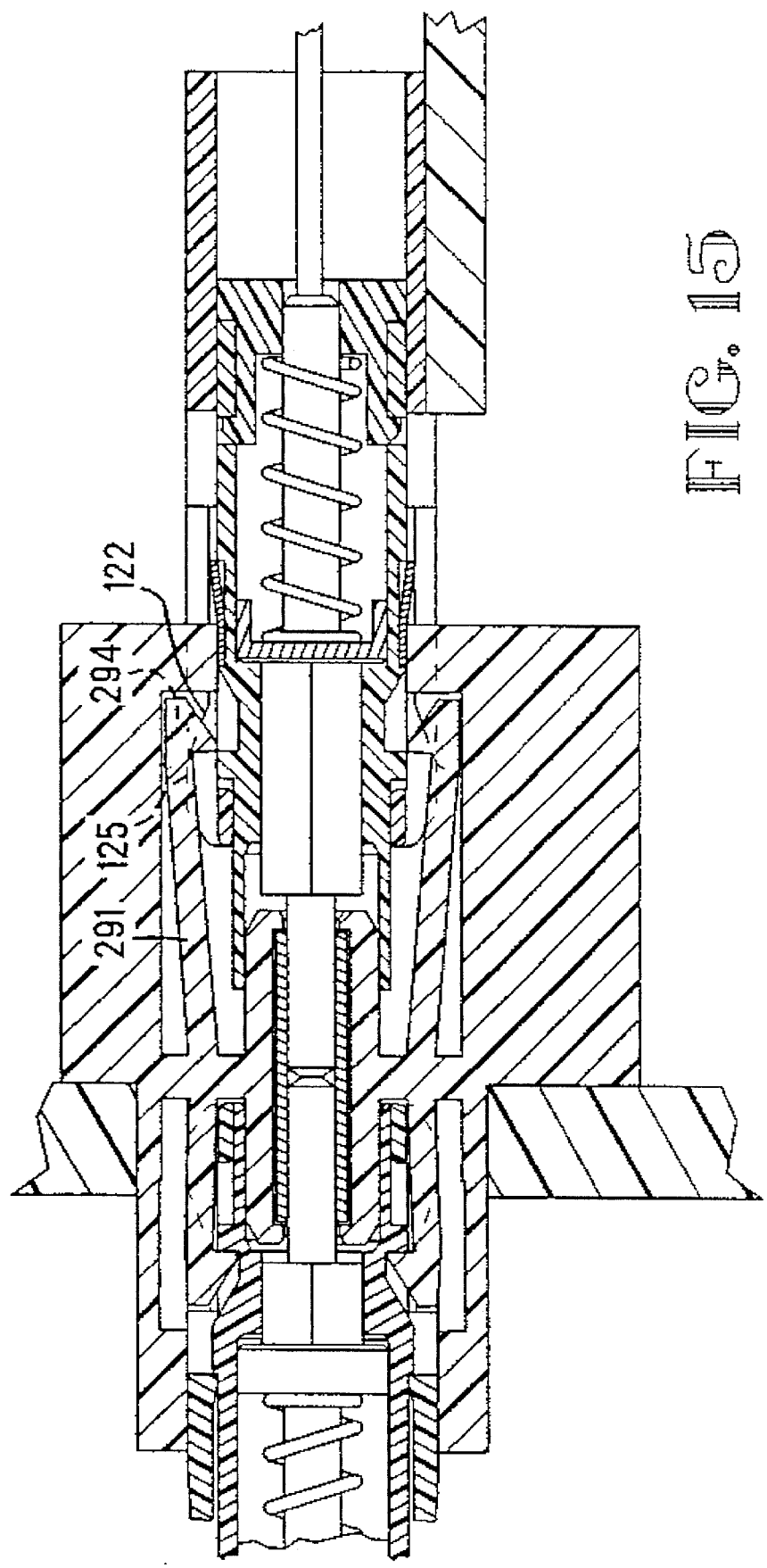
Figure 16:
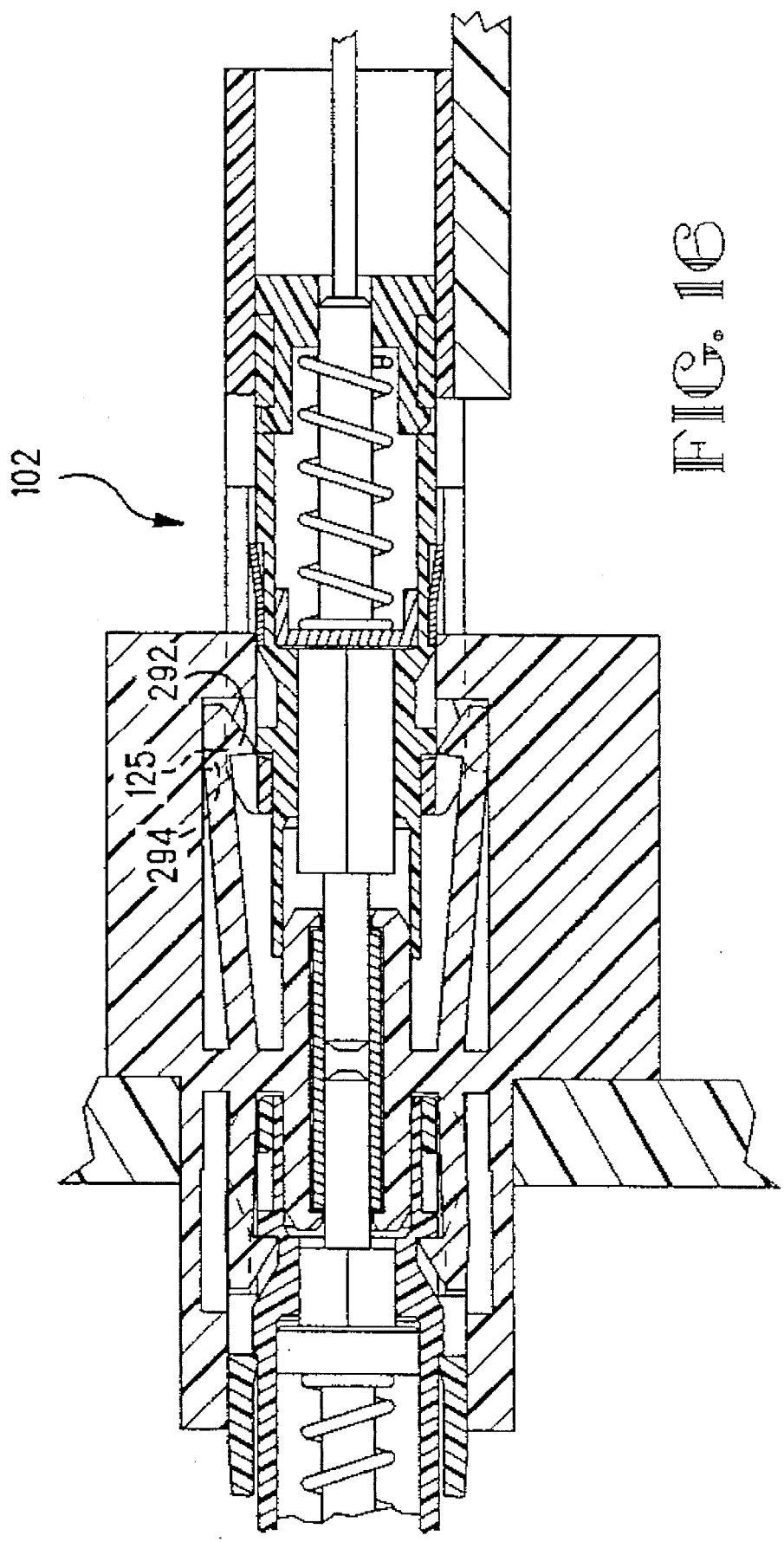
Figure 17:
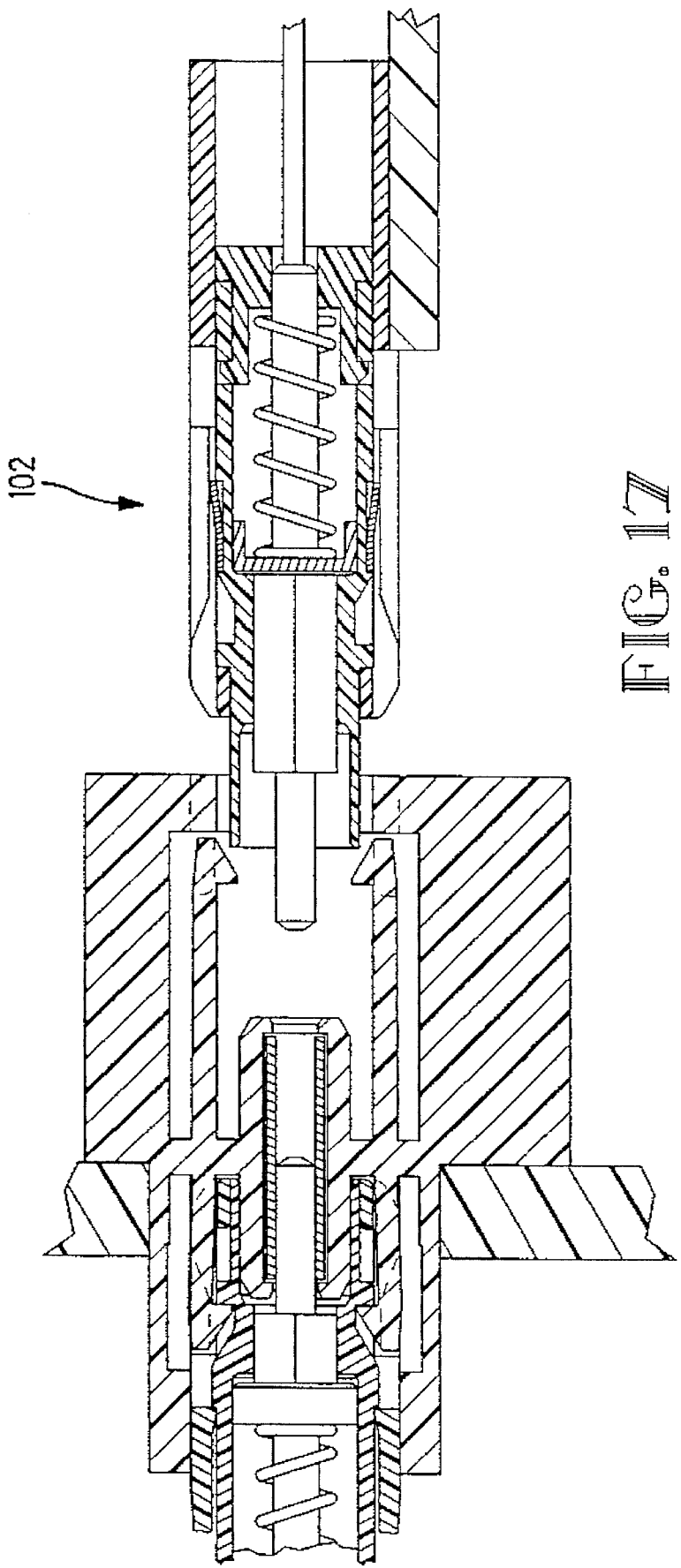

In order to release the plug from the jack, it suffices to pull back the plug housing 104, as shown in FIG. 14, that is, by retraction of the daughter board 101, whereby the wings 294 engage the release camming surface 122, forcing the latch arms 291 to bias resiliently outwards as shown in FIG. 15, until the wings 294 pass over the upper camming surface 125 (FIG. 16), thus enabling the latch projection 292 to pass over the transverse rib 128. The plug 102 can then be completely retracted from the jack as seen in FIG. 17, whereby the thrust lances 150 are once again engageable with the jack insert shoulder 152 for reconnection of the plug and jack by recommencing the steps illustrated by the FIGS. 9 to 12.

Figure 18:
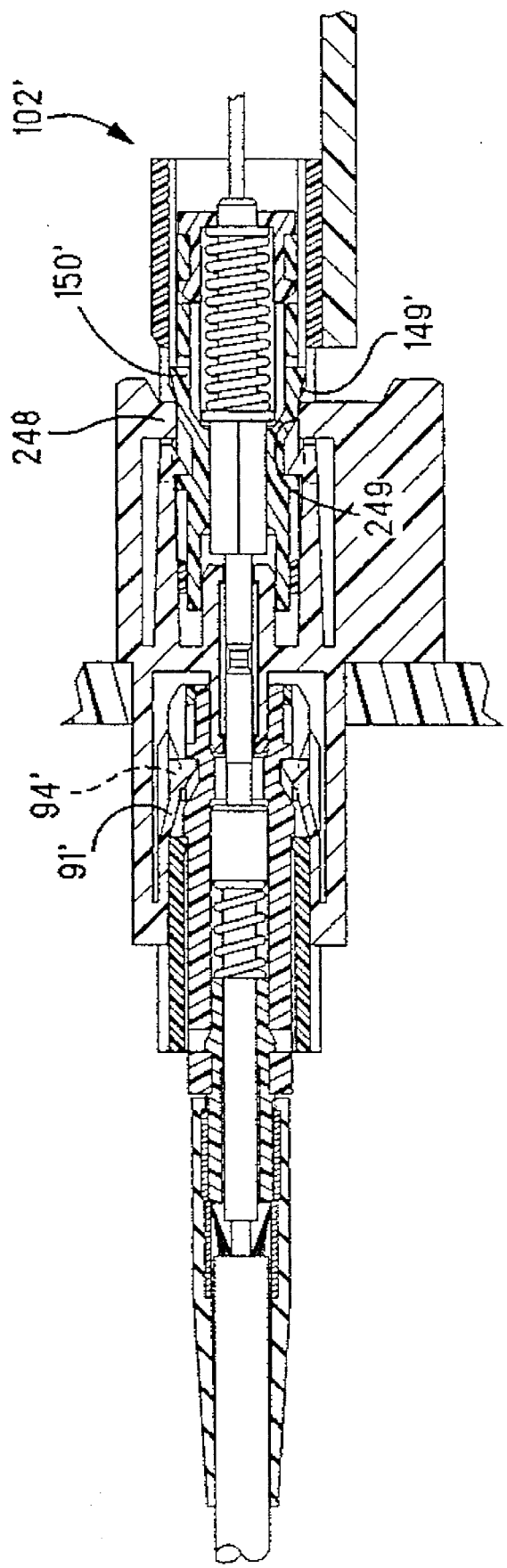
FIG. 18 is a cross sectional view of a slightly different embodiment of an optical connector with the plug and jack housings in solid lines.

With reference now to FIG. 18, an alternate embodiment of plug connector is shown in 102' whereby the latch arms or thrust members 150' are integrally moulded with the housing 109 and include camming surfaces 149 which cooperate with the ribs 248 on the jack housing to disconnect the insert body 109 from the outer housing 104. FIG. 18 further shows an alternate latch arm 91' which is reversely formed, and includes integral wing members 94'.

While the invention has been described with reference to a single plug housing, as shown in FIG. 7 as 104, a further connector assembly is shown in FIG. 19 at 300 comprising an electrical connector housing portion 301 and a fibre plug portion 302 having an outer housing 304. Any number of a plurality of cavities can be provided at 311 which will receive the insert members 106 (FIG. 7) in an identical manner. Camming members 320 are provided adjacent each cavity 311 for latching interconnection with the insert 106 as previously described. As shown in FIG. 19, the housing 304 has a lower surface 330 for abutment against the daughter board, and a plurality of aligning posts 332 extending therefrom for correct positioning of the housing 304 on the daughter board. As also shown in FIG. 19, the connector portion 301 includes a plurality of terminal inserts 340, which are similar to above mentioned European Application number (0 422 785).

The invention described above relates to the preferred embodiment. One could imagine, however, many different shapes sizes and attachment points of the plug housing, plug latches, jack housing, jack insert, thrust means and the number and shape of the camming members, as well as the number of optical fibres mounted within the connector, without departing from the spirit of this invention.

I claim:

1. An optical fibre connector comprising a receptacle jack for receiving on at least one side at least one ferrule for supporting an optical fibre, and a plug for optical connection therewith via connection spring means, characterized in that the jack comprises a housing, thrust disengagement means, and latching means; and the plug comprises a housing, at least one plug body with at least one ferrule mounted therein for supporting an optical fibre, thrust means to enable insertion of the plug into the jack, and latching means; whereby the jack latching means cooperate with the plug latching means for retention of the plug body to the jack for optical connection therebetween, and whereby the jack and the plug body are in a static relation during the optical connection, and the plug housing is axially movable over a tolerance absorption distance (T) with respect thereto, this axial movement not influencing the forces generated by the connection spring means.

2. The connector of claim 1 characterized in that each plug ferrule is mounted to a separate plug body.

3. The connector of claim 1 characterized in that the plug body is mounted substantially within a cavity of the plug housing and has an outer surface close to an inner surface of the cavity such that when the thrust means are disengaged the plug body, can slide axially guided in the cavity.

4. The connector of claim 3 characterized in that the plug housing has at a forward end a bridge portion (131) protruding into the cavity, the bridge portion cooperable with a transverse rib of the plug body to retain the plug body from forward extraction from the cavity.

5. The connector of claim 2 characterized in that the plug body is mounted substantially within a cavity of the plug housing and has an outer surface close to an inner surface of the cavity such that when the thrust means are disengaged the plug body, can slide axially guided in the cavity.

6. The connector of any of claims 1–3 or 5 characterized in that the thrust means comprises resilient lances attached to the insert and a shoulder of the plug housing against which the lances abut, such that the insert can be pushed into a latched connection with the plug via a force on the plug housing.

7. The connector of claim 6 characterized in that the lances are integral with a housing of a plug insert.

8. The connector of claim 6 characterized in that the lances project obliquely outwards into an opening of the plug housing such that the thrust disengagement means have access thereto via the opening.

9. The connector of claim 6 characterized in that the jack has ribs extending from the jack housing having an inner surface that resiliently biases the lances inward during insertion of the plug into the jack such that the lances disengage from the shoulder and the insert is free to slide axially rearwards.

10. The connector of any of claims 1–3 or 5 characterized in that the jack latching means comprises latches having a resilient arm attached to the jack housing and extending forwardly therefrom to a free end having a protrusion that cooperates with a rib on the plug body for retention thereof.

11. The connector of claim 10, characterized in that there is at least one pair of latches per plug ferrule.

12. The connector of any of claims 1–3 or 5 characterized in that the plug housing has camming members for cooperation with wings attached to resilient latches of the jack housing, the camming members having camming surfaces whereby the wings overlap these surfaces such that during retraction of the plug from the jack, the wings engage the camming surfaces causing the latches to bias resiliently outward hence unlatching the jack from the plug body.

13. The connector of claim 12 characterized in that the plug has at least one pair of camming members, the camming members extending axially from the top or from the bottom of the plug housing and separated by a cavity that allows access for a jack housing latch projection to engage with a rib of the plug body for retention of the plug to the jack.

14. The connector of claim 13 characterized in that there is at least one pair of camming members on the top side and opposing bottom side of the plug housing.

15. A fibre optic connector assembly, comprising a jack, and a plug member which is receivable in said jack in optical engagement therewith, the plug including an inner plug insert which carries a fibre in spring loaded condition therein, and the insert being slidably receivable within an outer housing, the inner body being axially movable within said housing, between a forward position provided by first stop means and a rearward position provided by second stop means, the fibre plug connector being characterized in that said second stop means are releasable to allow said inner body to move axially within said outer housing, to a position beyond said rearward position, thereby allowing said outer housing to move further forward, without undue spring load on said assembly.

16. A fibre optic connector assembly according to claim 15, characterized in that said second stop means are provided by a rearwardly extending resilient latch arm which abuts a forwardly facing latch face, the resilient latch arm being deflectable to a position clear from said face, to allow said housing to move further forward relative to said inner body.

17. A fibre optic connector assembly according either of claims 15 or 16, characterized in that said latches are deflected by actuator members positioned adjacent to the front face of the jack member.

18. A fibre optic connector assembly according to claim 16 characterized in that the receptacle jack has locking latch arms extending outwardly towards the plug receiving opening, and in that the housing surrounding the insert body includes an opening providing access to the stop member on the insert body, whereby a latch projection on the latch arm can extend through the opening to lock behind the stop member on the insert body.

19. A fibre optic connector assembly according to claim 18, characterized in that when in the position where the latch projection is positioned behind the stop member, the front face of the insert body is spaced from an inner face of the receptacle jack.

20. A fibre optic connector assembly according to claim 19, characterized in that said receptacle jack includes actuator members positioned adjacent to a front face of said jack, whereby said outer housing and insert body can be pushed forwardly to a position where said latch projections and stop member are spaced apart, whereby continued insertion of said housing causes the actuator members to deflect the second stop members such that the inner plug body is resiliently biased rearwardly to a position where the plug body is held exclusively by said latch projection whereby said outer housing can be floatably movable relative to said inner insert body.

21. A fibre optic connector assembly comprising a receptacle jack having a fibre receiving bore, a plug receiving cavity and latch arms extending forwardly and flanking said plug receiving cavity, and a fibre plug member having an outer housing retaining therein, a fibre insert body, the insert body having a forwardly loaded fibre positioned therein, the outer housing having an opening adjacent to a front face thereof, thereby said latch projections are engageable with a latching shoulder on said plug body, the assembly being characterized in that the outer housing is releasable from said plug body and the insert body is held exclusively by said latch arms, such that the housing is movable further forwardly.

22. The assembly of claim 20, characterized in that when in the position where the latch projections are engaging said latching shoulder, a front face of said insert body is spaced from the inner surface of said receptacle jack, and in that resilient lances releasably latch said insert body within the housing, and in that the receptacle jack includes actuator members adjacent to a front face of the receptacle jack, whereby the housing and insert body are moved forward together retained by said lances to a position where said locking projections are spaced from said latching shoulder, the actuator members extending through the opening to deflect the resilient lances to release the insert body from the outer housing, and the insert body is spring loaded outwardly to the extent where the latching projection is again in engagement with said shoulder.

23. The connector of claim 7 characterized in that the lances project obliquely outwards into an opening of the plug housing such that the thrust disengagement means have access thereto via the opening.

24. The connector of claim 6 characterized in that the jack latching means comprises latches having a resilient arm attached to the jack housing and extending forwardly therefrom to a free end having a protrusion that cooperates with a rib on the plug body for retention thereof.

25. The connector of claim 24 characterized in that there is at least one pair of latches per plug ferrule.

26. The connector of claim 10 characterized in that the plug housing has camming members for cooperation with wings attached to resilient latches of the jack housing, the camming members having camming surfaces whereby the wings overlap these surfaces such that during retraction of the plug from the jack, the wings engage the camming surfaces causing the latches to bias resiliently outward hence unlatching the jack from the plug body.

27. The connector of claims 24 characterized in that the plug housing has camming members for cooperation with wings attached to resilient latches of the jack housing, the camming members having camming surfaces whereby the wings overlap these surfaces such that during retraction of the plug from the jack, the wings engage the camming surfaces causing the latches to bias resiliently outward hence unlatching the jack from the plug body.

28. The connector of claim 6 characterized in that the plug housing has camming members for cooperation with wings attached to resilient latches of the jack housing, the camming members having camming surfaces whereby the wings overlap these surfaces such that during retraction of the plug from the jack, the wings engage the camming surfaces causing the latches to bias resiliently outward hence unlatching the jack from the plug body.

29. The connector of claim 26 characterized in that the plug has at least one pair of camming members, the camming members extending axially from the top or from the bottom of the plug housing and separated by a cavity that allows access for a jack housing latch projection to engage with a rib of the plug body for retention of the plug to the jack.

30. The connector of claim 27 characterized in that the plug has at least one pair of camming members, the camming members extending axially from the top or from the bottom of the plug housing and separated by a cavity that allows access for a jack housing latch projection to engage with a rib of the plug body for retention of the plug to the jack.

31. The connector of claim 28 characterized in that the plug has at least one pair of camming members, the camming members extending axially from the top or from the bottom of the plug housing and separated by a cavity that allows access for a jack housing latch projection to engage with a rib of the plug body for retention of the plug to the jack.

32. The connector of claim 26 characterized in that there is at least one pair of camming members on the top side and opposing bottom side of the plug housing.

33. The connector of claim 27 characterized in that there is at least one pair of camming members on the top side and opposing bottom side of the plug housing.

34. The connector of claim 28 characterized in that there is at least one pair of camming members on the top side and opposing bottom side of the plug housing.

35. A hybrid connector for forming an electrical and optical interconnection between a base and a mating component where the base is fixed and the mating component is pluggable thereto, the base including a complementary connector including an optical receptacle jack including a housing, thrust disengagement means and latching means said jack being in communication with an optical transmission member, the hybrid connector mounted on the mating component and comprising an electrical connector portion wherein electrical contacts are disposed within a housing for engaging complementary contacts on the base and a fibre plug portion having an outer housing with a cavity therein where an insert having a plug body including an optical ferrule is disposed within the cavity in a slidable and spring biased manner for abutting the jack to establish optical coupling with the optical transmission member; the insert further including thrust means to enable insertion of the insert into the jack and latching means that cooperate with the latching means of the receptacle jack for retention of the insert and jack in static relation during the optical connection, where the plug housing is axially moveable over a tolerance absorption distance relative the jack and where this ayial tolerance absorption displacement does not influence the forces generated by the spring biased abuttment.

36. The hybrid connector of claim 35 wherein the fibre plug portion includes a plurality of cavities each having an insert therein.

37. The hybrid connector of claim 35 or 36 wherein the hybrid connector includes a plurality of board mounts extending therefrom.

* * * * *